No. 747,143. PATENTED DEC. 15, 1903.
H. W. COLBY.
DUMPING FLOOR FOR MALT KILNS.
APPLICATION FILED MAY 1, 1902.
NO MODEL. 2 SHEETS—SHEET 2.
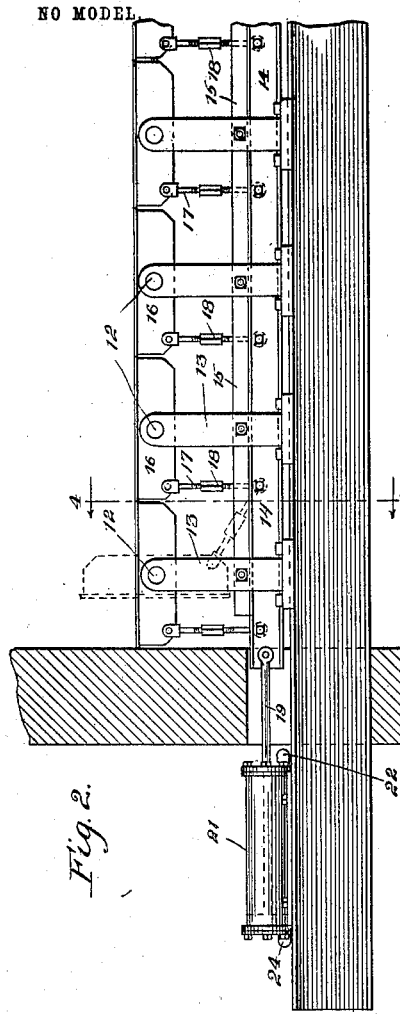
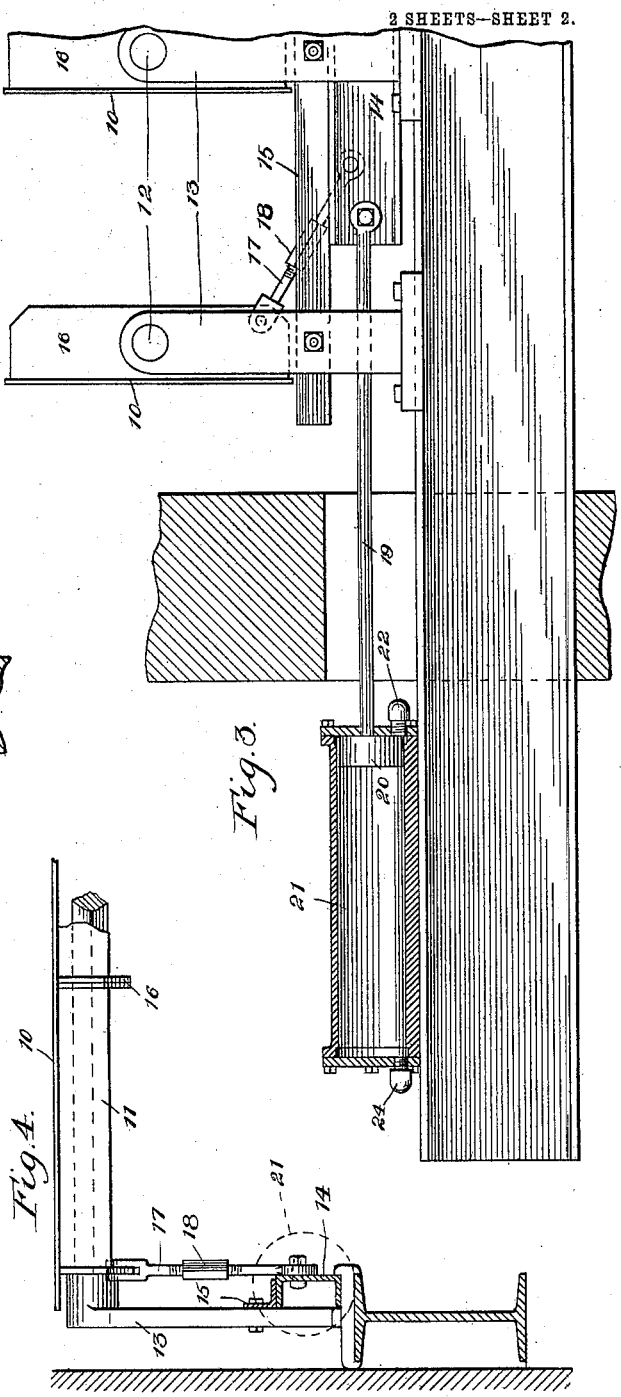
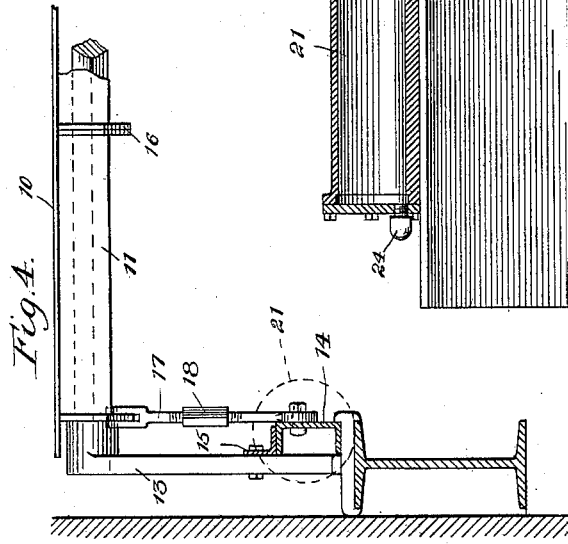
Witnesses.
Wm. Geiger
Inventor:
Harry W. Colby
By Munday, Evarts & Adcock.
Attorneys No. 747,143. Patented December 15, 1903.

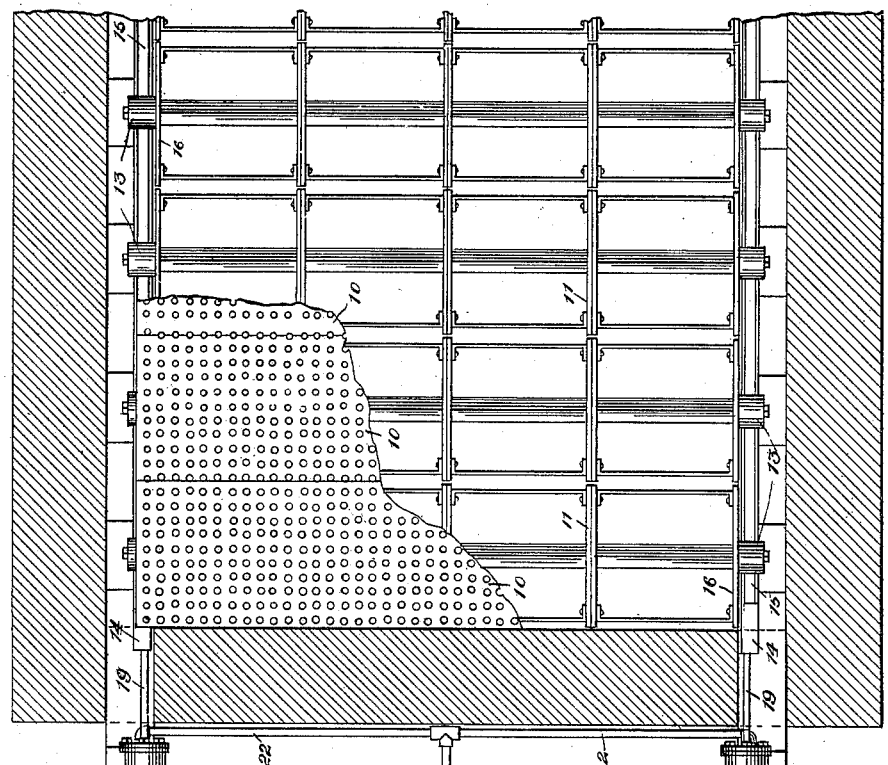
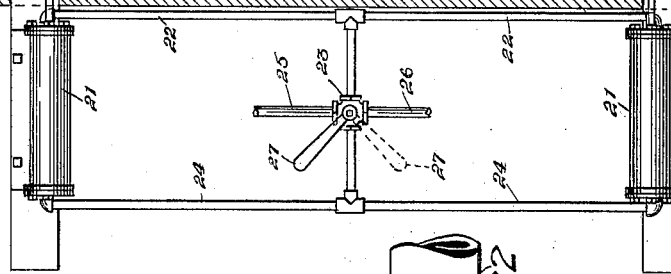
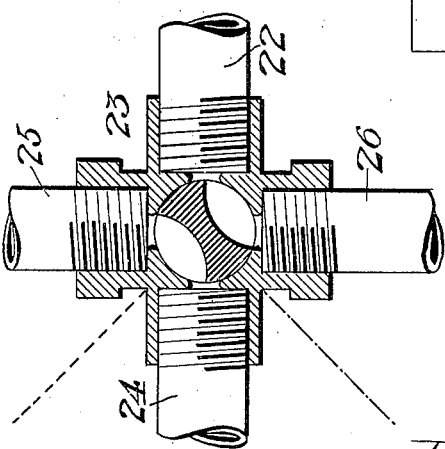

UNITED STATES PATENT OFFICE.

HARRY W. COLBY, OF CHICAGO, ILLINOIS, ASSIGNOR TO AUTOMATIC RACKING MACHINE COMPANY, OF CHICAGO, ILLINOIS, A CORPORATION OF ILLINOIS.

DUMPING-FLOOR FOR MALT-KILNS.

SPECIFICATION forming part of Letters Patent No. 747,143, dated December 15, 1903.

Application filed May 1, 1902. Serial No. 105,449. (No model.)

*To all whom it may concern:*

Be it known that I, HARRY W. COLBY, a citizen of the United States, residing in Chicago, in the county of Cook and State of Illinois, have invented a new and useful Improvement in Dumping-Floors for Malt-Kilns, of which the following is a specification.

This invention relates to an improvement in dumping-floors for malt-kilns.

The object of the present invention is to produce a malt-kiln floor comprising a number of dumping-sections, which may be simultaneously dumped by power and which when the grain is upon it will always present a smooth even surface, offering no obstruction to the shovel of the operator or the shovels of a power turning-machine in turning or stirring the malt on the floor, and a construction which will permit the employment of a cylinder and piston with a straight linear movement complete within the piston itself for dumping and closing the floor by a single reciprocation in said piston; and the invention consists of the novel combination of parts and devices shown and described and possessing the mode of operation set forth.

In the drawings which accompany the specification and which form a part thereof, Figure 1 is a top or plan view of the improved kiln-floor. Fig. 2 is a side elevation of the same. Fig. 3 is a similar side elevation to Fig. 2, but upon a larger scale and showing the cylinder in section. Fig. 4 is a section on line 4 4 of Fig. 2. Fig. 5 is a horizontal section of the controlling-valve.

Like characters of reference made use of upon the drawings denote like parts wherever used.

In said drawings, 10 represents the several sections of the floor, each being shown to consist of a plate or sheet of metal perforated for the passage of the hot air up through the malt, said plates being strengthened in any suitable way by an underlying framework 11, which may be of any ordinary construction, such as is used in these dumping-floors. Each section is in the form of a parallelogram and abuts closely against its neighbor at each side, so that when in a horizontal position the assemblage of sections forms and constitutes a smooth floor. At each end each of the sections is centrally pivoted by a pivot 12 to a standard 13 of the framework of the kiln, so that each of the sections is free to be turned into a vertical position. Beneath the floor is a bar 14, free to slide endwise, held down against its bearings or support by a cap-bar or shoulder 15. At each end of these sections is the end piece 16 of the framework, and extending from this end piece 16 to the bar 14 is the connecting-link 17, pivoted to the end piece 16 and to the bar 14. The link 17 is made in two parts, the adjacent ends of which are screw-threaded by screws cut with opposite inclinations and are united by a nut 18, by the turning of which the link may be lengthened or shortened at pleasure. The purpose of this device for adjusting the length of the link is that the said links may be caused to support the floor positively when they are in the vertical position and the floor be perfectly level, so that the edges of the sections will be smooth and not project one higher than the other. This arrangement of links, bars, and sections is duplicated at each end of the floor and the bars 14 are connected by a piston-rod 19 at each end to the pistons 20 of cylinders 21, which are preferably hydraulic cylinders. The cylinders 21 have their front ends connected by pipes 22 to a valve 23 and their rear ends connected by pipes 24 to the same valve. This valve is a four-way valve, one way of which connects to the pipes 24, another way to the pipes 22, a third way to the power-supply 25, and a fourth way to the exhaust 26. When the operating-handle of this valve is turned in one direction, the water, steam, or compressed air, whichever may be used, is admitted to one end of the cylinders simultaneously and the exhaust opened from the other end of the said cylinders, causing the pistons to travel a complete stroke in one direction, and when the handle is turned in the other position the piston is similarly caused to move a complete stroke in the other direction. It will be seen that by operating this hand-lever 27 of the valve 23 the floor may be dumped in all of its sections and returned to position by a simple straight movement of the pistons.

An important feature of the invention, which will be readily understood from the foregoing description of the structure, is the positive supporting of the pivoted sections of the floor by the links 17, which stand in a vertical position when the floor is undumped, so that said sections are rigidly held against any movement on the pivots in either direction and the further provision that said links are made adjustable as to their length by means of which the floor can be set perfectly level to start with and thereafter rendered level as the parts wear in use. This has been one of the difficulties encountered in dumping-floors, and the present invention entirely overcomes this and enables the dumping to be done readily by power.

The operation is as follows: The sections of the floor being in a horizontal position and the pivoted links consequently in a vertical position, the operator with a suitable wrench turns all of the nuts 18, lengthening or shortening the links, and thus turning the sections slightly on their pivots, and the edge of no section projects above or below that of its neighbor. The floor is now ready to receive the malt, which being loaded upon it can be easily shoveled about by the operator at will, the sections being held rigidly in position by the vertical links from tipping up or down and offering a smooth surface for the shovel to work upon. After the malt has been sufficiently treated and it is desired to dump the same the hand-lever 27 is turned, so that the power is admitted to the pipes 24 and the rear of the cylinders 21, and the pistons 20 are thereby pushed forward the full limit of their stroke, carrying the bars 14 forward with them, which moves the pivoted links into the inclined position shown in Fig. 3 and the several sections into the vertical position shown in said figure, thus dumping the malt. The reverse operation of the cylinders will carry said sections back in said position shown in Fig. 2, when the floor will become again level and rigidly held against movement.

The peculiar advantage of using hydraulic cylinders in the hereinabove-described mechanism consists in the fact that the pistons will be locked by the incompressible fluid in whatever position they may assume, and this without any special locking device, and hence the floor will be rigidly held in whatever position the pistons will place it—that is to say, fully closed, fully open, or partly open—whereby the absence of lost motion in the joints of the apparatus may be fully taken advantage of.

I claim—

1. In a malting-floor, the combination of pivoted sections, a bar extending across said sections and links connecting said sections and said bar, pivoted to both, and provided with means for adjusting their length, substantially as specified.

2. In a malting-floor, the combination of pivoted sections, two bars extending across said sections, one at each end, links connecting said sections at each end with said bars and pivoted thereto and means for adjusting the length of the links, substantially as specified.

3. In a malting-floor, the combination of pivoted sections pivotally connected to a bar, a hydraulic cylinder the piston of which is connected to said bar for operating the same and a valve controlling the admission of liquid to the cylinder to lock the floor-sections in any position, substantially as specified.

4. In a malting-floor, the combination of a series of pivoted trays pivotally connected and supported by a series of adjustable links from a bar, said bar and a cylinder and piston for simultaneously tilting the series of trays by moving the bar, substantially as specified.

HARRY W. COLBY.

Witnesses:
H. M. MUNDAY,
JOHN W. MUNDAY.